US011361196B2

(12) United States Patent
Lee et al.

(10) Patent No.: US 11,361,196 B2
(45) Date of Patent: *Jun. 14, 2022

(54) OBJECT HEIGHT ESTIMATION FROM MONOCULAR IMAGES

(71) Applicant: Zoox, Inc., Foster City, CA (US)

(72) Inventors: Tencia Lee, San Francisco, CA (US); James William Vaisey Philbin, Palo Alto, CA (US)

(73) Assignee: Zoox, Inc., Foster City, CA (US)

(*) Notice: Subject to any disclaimer, the term of this patent is extended or adjusted under 35 U.S.C. 154(b) by 111 days.

This patent is subject to a terminal disclaimer.

(21) Appl. No.: 16/941,815

(22) Filed: Jul. 29, 2020

(65) Prior Publication Data

US 2020/0380316 A1 Dec. 3, 2020

Related U.S. Application Data

(63) Continuation of application No. 15/453,569, filed on Mar. 8, 2017, now Pat. No. 10,733,482.

(51) Int. Cl.
*G06K 9/62* (2022.01)
*G06N 3/04* (2006.01)
(Continued)

(52) U.S. Cl.
CPC ......... *G06K 9/6277* (2013.01); *G05D 1/0088* (2013.01); *G05D 1/0246* (2013.01); *G06K 9/6256* (2013.01); *G06N 3/04* (2013.01); *G06N 3/08* (2013.01); *G06T 3/40* (2013.01); *G06T 7/74* (2017.01); *G06V 10/44* (2022.01); *G06V 30/194* (2022.01); *G06T 2207/10004* (2013.01);

(Continued)

(58) Field of Classification Search
None
See application file for complete search history.

(56) References Cited

U.S. PATENT DOCUMENTS 5,904,215 A * 5/1999 Ikeda ............... B60T 8/174
180/169
2006/0112042 A1 5/2006 Platt et al.
(Continued)

OTHER PUBLICATIONS

Office Action for U.S. Appl. No. 15/453,569, dated Sep. 23, 2019, Lee, "Object Height Estimation From Monocular Images", 16 pages.

*Primary Examiner* — Matthew C Bella
*Assistant Examiner* — Brian D Shin
(74) *Attorney, Agent, or Firm* — Lee & Hayes, P.C.

(57) ABSTRACT

Systems and methods for estimating a height of an object from a monocular image are described herein. Objects are detected in the image, each object being indicated by a region of interest. The image is then cropped for each region of interest and the cropped image scaled to a predetermined size. The cropped and scaled image is then input into a convolutional neural network (CNN), the output of which is an estimated height for the object. The height may be represented by a mean of a probability distribution of possible sizes, a standard deviation, as well as a level of confidence. A location of the object may be determined based on the estimated height and region of interest. A ground truth dataset may be generated for training the CNN by simultaneously capturing a LIDAR sequence with a monocular image sequence.

20 Claims, 6 Drawing Sheets

(51) Int. Cl.
  *G05D 1/00*     (2006.01)
  *G06V 10/44*    (2022.01)
  *G06T 7/73*     (2017.01)
  *G05D 1/02*     (2020.01)
  *G06N 3/08*     (2006.01)
  *G06T 3/40*     (2006.01)
  *G06V 30/194*   (2022.01)

(52) U.S. Cl.
  CPC .............. *G06T 2207/10028* (2013.01); *G06T 2207/20081* (2013.01); *G06T 2210/12* (2013.01)

(56) References Cited

U.S. PATENT DOCUMENTS

| | | |
|---|---|---|
| 2006/0139371 A1 | 6/2006 | Lavine et al. |
| 2006/0280364 A1* | 12/2006 | Ma ..................... G06K 9/3233 382/173 |
| 2008/0161986 A1 | 7/2008 | Breed |
| 2011/0222774 A1 | 9/2011 | Hong et al. |
| 2013/0101210 A1 | 4/2013 | Tang |
| 2014/0270536 A1 | 9/2014 | Amtrup et al. |
| 2015/0242695 A1* | 8/2015 | Fan ..................... G06K 9/6218 382/103 |
| 2017/0032222 A1* | 2/2017 | Sharma ................ G06K 9/4619 |
| 2017/0083792 A1 | 3/2017 | Rodriguez-Serrano et al. |
| 2017/0124727 A1 | 5/2017 | Amat Roldan et al. |
| 2017/0154425 A1* | 6/2017 | Pierce ..................... G06T 7/73 |

* cited by examiner

OBJECT HEIGHT ESTIMATION FROM MONOCULAR IMAGES

CROSS REFERENCE TO RELATED APPLICATIONS

This is a continuation application which claims priority to commonly assigned, co-pending U.S. patent application Ser. No. 15/453,569, filed Mar. 8, 2017. Application Ser. No. 15/453,569 is fully incorporated herein by reference.

BACKGROUND

Multiple applications require information about objects present in an environment. For example, various autonomous systems, such as autonomous vehicles and autonomous drones, utilize data indicative of object dimensions and/or locations for collision and obstacle avoidance. In order to effectively navigate a three dimensional environment, such autonomous systems need information about the obstacle sizes (e.g. any or all of a height, width, or length) and/or locations. Additionally, these systems require estimates of how such objects interact with the environment.

Though various sensors, such as radar and LIDAR, can provide location information of objects in an environment, they are much more expensive than simple camera systems.

BRIEF DESCRIPTION OF THE DRAWINGS

The detailed description is described with reference to the accompanying figures. The use of the same reference numbers in different figures indicates similar or identical components or features.

DETAILED DESCRIPTION

Figure 1:
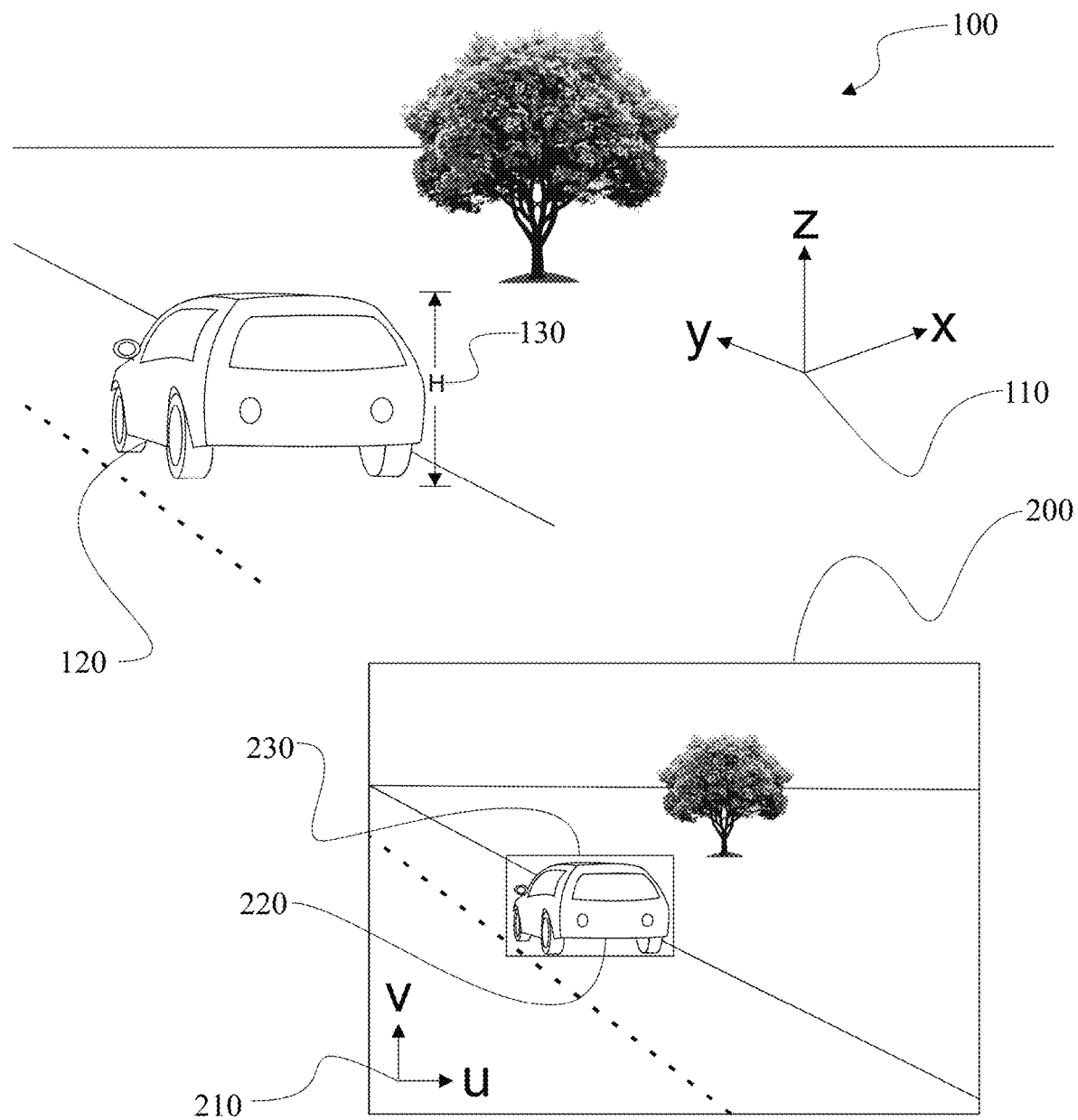
FIG. 1 illustrates an example environment and corresponding image from an image capture device, the image representing the example environment.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description.

It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

As briefly described above, sizes (i.e. one or more of a height, width, or length) and/or locations of objects in an environment relative to an observer are needed in various applications. As a brief example, many autonomous systems, such as semi- and fully autonomous vehicles, autonomous drones, and the like, use locations and/or sizes of objects present in an environment, as well as their respective locations (i.e. position in an environment), to perform tracking, navigation, and collision avoidance. The following detailed description is directed to systems, devices, and techniques for estimating an object size and location from a monocular image (e.g., an image captured using a single image capture device).

Traditional systems which provide three dimensional information, such as LIDAR and RADAR, can provide information about 3D objects in an environment, but are expensive and require significant computational resources. Generally, LIDAR sensors can generate a large amount of range measurements within a short amount of time (e.g., 1,000-100,000 range measurements every 0.1 seconds). Recording these points requires large amounts of storage. Additionally, the large number of points returned from such a system may subsequently be processed to segment objects in the environment so as to provide location and size information for a particular object. Segmenting objects out of such a large number of points can be computationally expensive. Furthermore, these LIDAR systems are also limited by additional environmental constraints, such as weather.

Estimates of object size and location in an environment may be provided from a simple image capture device, as will be described in detail below. Such a method relies on commercially available image capture devices, significantly reducing the cost and computational requirements to provide the three dimensional information of objects in an environment.

In some embodiments, machine learning is used to predict object information (e.g. object sizes and/or locations) from images. Machine learning generally refers to a broad class of such algorithms in which an output is generated based on learned parameters, which will be discussed in detail below. In some embodiments, an example machine learning algorithm which can be used to generate object information is a convolutional neural network, or CNN. CNNs are biologically inspired algorithms which pass input data through a series of connected layers to produce an output. Each layer in a CNN may comprise any number of layers, and may also comprise another CNN. The manner in which the various layers of a CNN are connected to one another is generally referred to as an architecture of the CNN. The architecture for a CNN which produces segmented images will be discussed in detail below.

The improved architecture for a convolutional neural network, as described herein, improves a functioning of a computing device by reducing processing time and/or increasing an accuracy of results in a machine learning context. For example, a CNN, once adequately trained, can output predicted sizes without significant calculations, thereby improving processing time and/or an accuracy of object information. These and other improvements to the functioning of the computer are discussed herein.

Exemplary Convolutional Neural Network (CNN) Architecture

In general, CNNs comprise multiple layers. Depending on the problem to be solved, differing layers and connections between layers can be used. The architecture of the CNN refers to which layers are used and how they are connected. As will be discussed in detail below, a CNN which has been trained can form the basis of another CNN. In any embodiment, the layers in the architecture can be selected based on the training dataset used, the complexity of the objects, and the like.

Each layer in a CNN architecture creates some association of information. Such an architecture may comprise a previously trained CNN, such as, for example, a Visual Geometry Group (VGG) CNN. In some embodiments, a previously trained CNN, or portions thereof, may have learned parameters from one training dataset before being incorporated into another CNN.

Exemplary Training of the Convolutional Neural Network (CNN)

To produce a valid output, a CNN must first learn a set of parameters, or be "trained." Training is accomplished by inputting a dataset into the CNN, the dataset being associated with expected output values. These expected output values may generally be referred to as "ground truth." For example, a ground truth dataset used to train a network to predict an object height may include images which contain one or more predetermined objects, each of which may have an associated, known, height. The accuracy of a CNN may be based on the amount of data provided in the training set. In some instances, as described herein, datasets can include one or more images representing real-world scenes and may be annotated by hand. In some instances, a dataset can include synthetic (e.g., computer generated) data that include objects having a predetermined size and/or location. Training can be performed using offline and/or online data.

Loss functions can be used to adjust internal parameters of the CNN during training. The loss functions are functions of the expected output (or ground truth) values for the dataset and values output by the CNN. Information contained in loss functions can be sent through the CNN as back propagations to adjust internal parameters, thereby tuning the CNN to provide valid outputs. All else being equal, the more data that is used to train a CNN, the more reliable the CNN may be (e.g., in providing accurate segmentations and/or classifications).

One example of such a loss function which can be used to train a CNN to predict object sizes from images is the softmax function, though any other function of input images with expected, or ground truth, measurements is contemplated. Other exemplary loss functions include, but are not limited to, support vector machine (SVM) loss, hinge loss, etc.

Increasing the Amount of Training Data (Data Augmentation)

As described above, the accuracy of a CNN can be based at least in part on the amount of data provided in the training set, with more data or a higher number of images in the training set often providing more accurate results. Because datasets have a limited number of images, it is possible to increase the amount of data provided to the CNN for training by perturbing the input data from a given training dataset. Various perturbations include mirroring a cropped portion, enlarging the area for cropping by some amount (for example 20%), adding noise to the image, resizing the image to some fixed dimensions (for example 224×224), varying color, brightness, contrast, etc., and varying the locations of the corners of the image. Additionally, by extending the dataset through this perturbation method, a smaller training dataset can be used, thereby requiring less memory storage space on a computer. More details are provided below with reference to FIGS. 1-6.

FIG. 1 illustrates an example environment 100. As depicted, the environment 100 may comprise several objects, such as vehicle 120 having a height, H, 130. The environment 100 may be associated with a coordinate system 110. Though depicted in a particular orientation for illustrative purposes in FIG. 1, the coordinate system may be in any other orientation (e.g. x-forward, y-forward, z-forward, left-handed, or right-handed). A location of the vehicle 120 may be expressed in terms of the coordinate system 110, such as, for example, using a three dimensional coordinate (x, y, z), or the like.

A representation (e.g. image data) of the environment 100 may be captured by an image capture device to form image 200. Such an image capture device may be an RGB camera, an RGB-D camera, an intensity camera, a depth camera, or any other device capable of producing an image, such as image 200, from an environment, such as environment 100. Objects in the environment 100 correspond to object images in image 200. For example, the vehicle 120 may be represented in image 200 by vehicle image 220. The image 200 may have an associated image coordinate system 210 such that object images (such as vehicle image 220) can be located in the image 200 by a pair of coordinates, for example (u, v).

In some embodiments, it is necessary to determine that object images are located in image 200. In those embodiments, the image 200 may be passed through an object detector. The object detector takes the image 200 as an input and outputs a region of interest. In some embodiments, such a region of interest may be a bounding box, such as bounding box 230. In some embodiments, such an object detector may be selected to detect only certain classes of objects (e.g. only vehicles, only pedestrians, only buildings, etc.). In some embodiments, such an object detector may be selected to detect multiple classes of objects. As a non-limiting example, such an object detector may be an additional convolutional neural network, though any other object detector which outputs regions of interest for objects based on an input image is contemplated.

Figure 2:
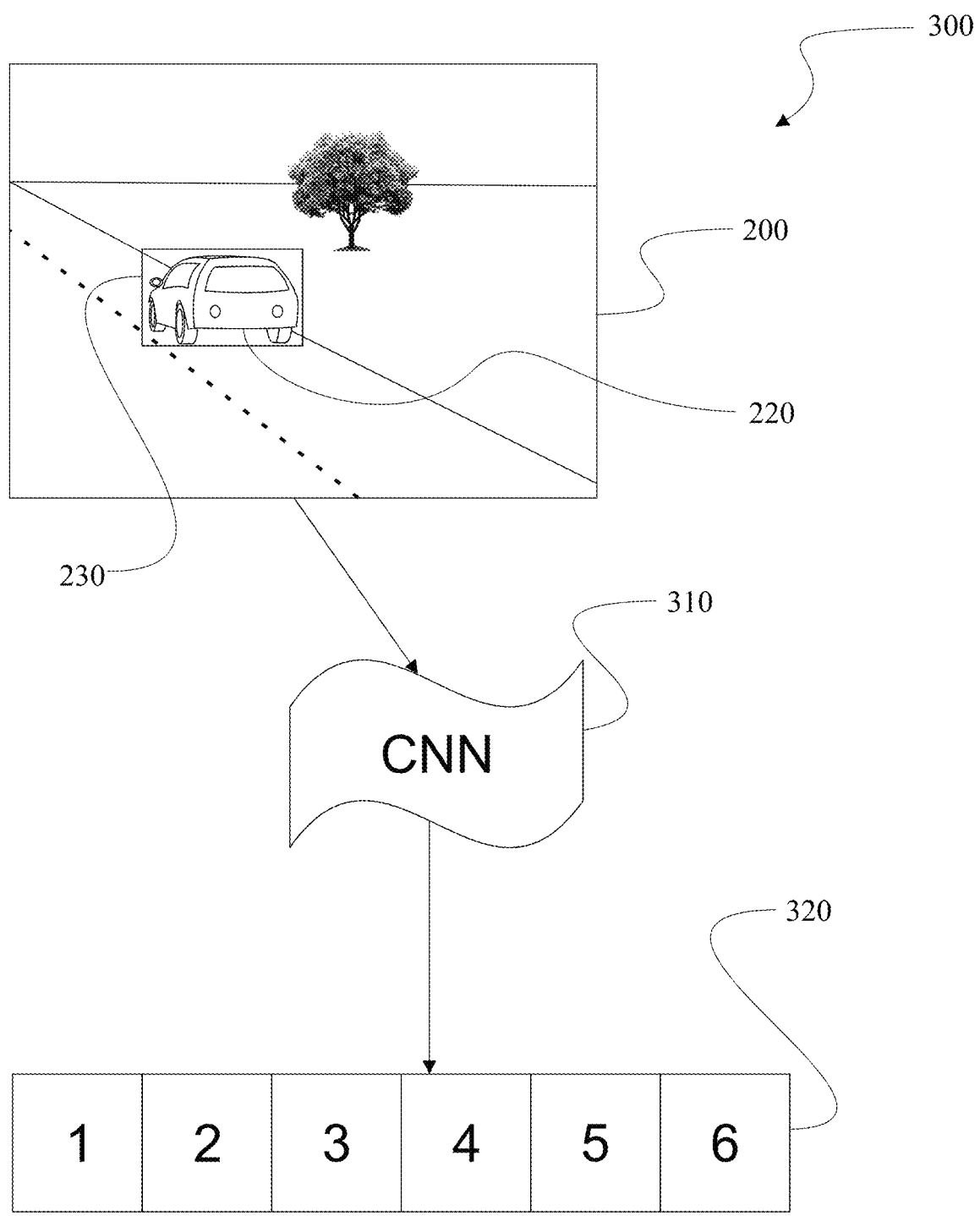
FIG. 2 illustrates an example block diagram for recovering an object height from a monocular image using a convolutional neural network.
Figure 3:
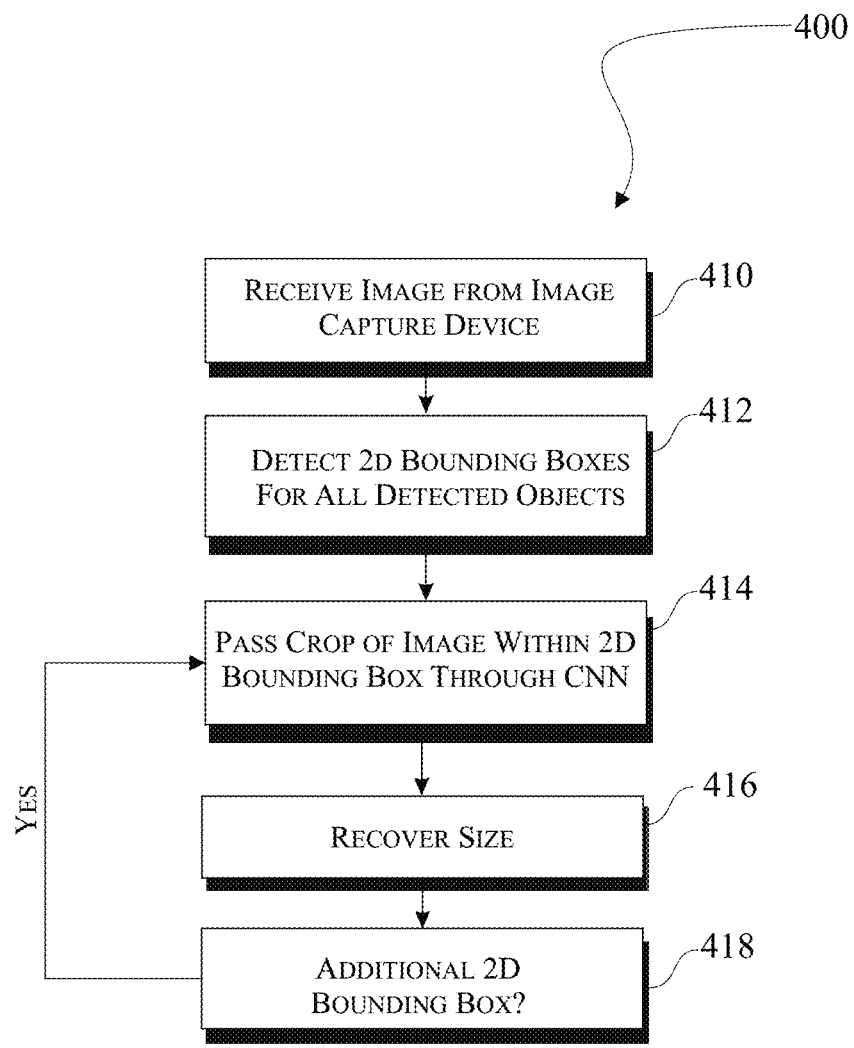
FIG. 3 depicts an example flowchart for a process to recover object height from a monocular image.
Figure 5:
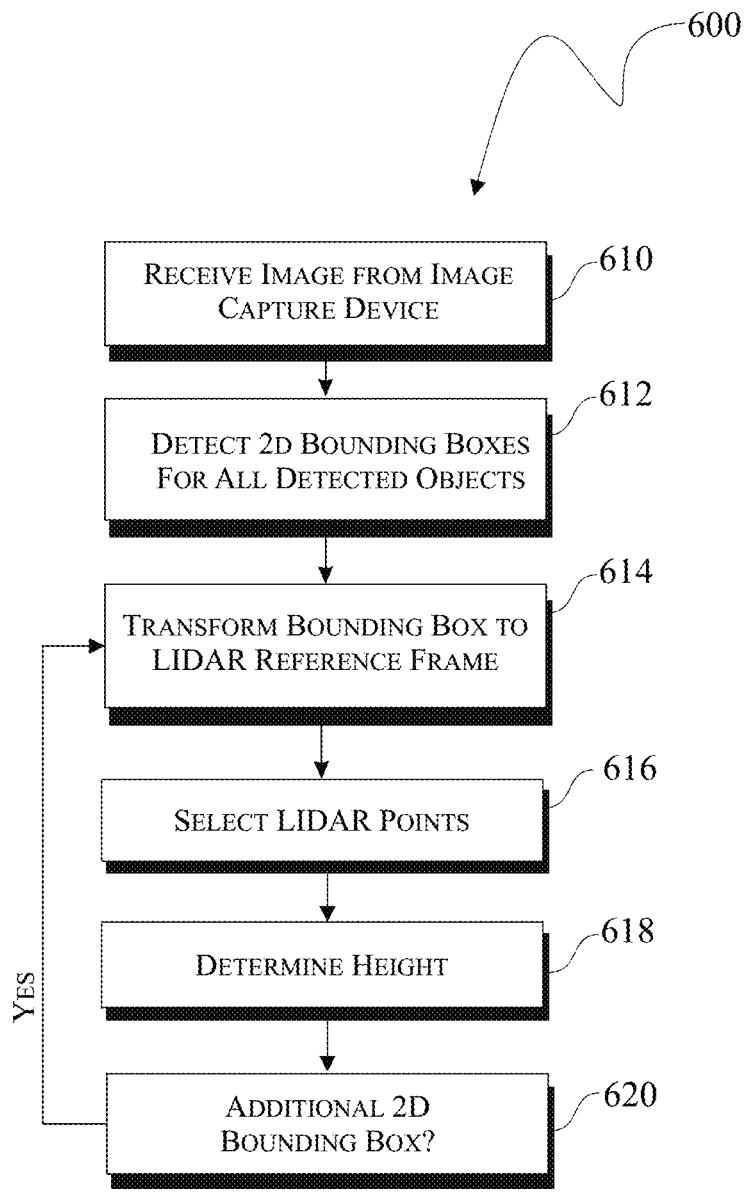
FIG. 5 depicts an example flowchart for creating a ground truth dataset for training a convolutional neural network.

FIGS. 2, 3, and 5 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 2 illustrates an example process 300 for estimating an object's location and size from a monocular image. As shown, process 300 begins with an input image 200. An object detector is run on image 200. In some examples, the object detector may be selected to detect certain classes of objects (e.g. only vehicles, only pedestrians, only buildings, etc.). As illustrated in FIG. 2, the object detector may detect all vehicles, such as vehicle image 220. The object detector then, in turn, may output a region of interest. As a non-limiting example, the region of interest may be a bounding box, such as bounding box 230. The bounding box 230 may be a rectangle that is sized and positioned to have a minimum area and completely enclose vehicle image 220.

The image 200 is then cropped at the region of interest to form a cropped image. In some examples, the cropped image is resized and/or scaled to a fixed size (e.g. 224×224), such that every cropped image has the same dimensions. The cropped image may then be input into a CNN 310. In some examples, the CNN 310 comprises a Visual Geometry Group (VGG) CNN which is modified to accept fixed sized images and is further modified to comprise two inner product layers of variable size (as one example, the inner product layers have a size of 128), the two inner product layers followed by a down-sampling pooling layer. In some embodiments, where the cropped images input to the CNN 310 have multiple channels (e.g. RGB, depth, etc.) the CNN 310 may be terminated by a 1-by-1 convolution layer to reduce the number of channels. Based, at least in part, on the cropped image, the CNN 310 then outputs a probability distribution 320.

The probability distribution 320 may be represented by a series of bins (e.g. bins 1-6), each bin representing an estimated range of size for the object. As illustrated in FIG. 2, the probability distribution 320 comprises six (6) bins, but any number of bins is contemplated. By way of non-limiting example, bin 1 may represent an estimated range of 0-1 m, bin 2 an estimated range of 1-2 m, and so on through bin 6, representing an estimated range of anything more than 5 m. Though depicted as having 6 bins, the probability distribution 320 may have more, or fewer, bins. In some embodiments, the probability distribution 320 may have 8 bins. In some embodiments, an estimated size of the object is retrieved as the center value of the bin having the highest probability. In some embodiments, the estimated size of the object is the weighted average of the center value of the bin having the largest probability and the center values of the surrounding two or more bins. In some embodiments, the probability distribution 320 is used to fit a function, such as, for example, a Gaussian or parabola. Based on the estimated fit for the function, the estimated size is returned corresponding to the largest value of the function. In some embodiments, the estimated size output by the CNN 310 may also comprise a mean, a standard deviation, and a confidence score. Such a mean, standard deviation, and/or confidence score may be calculated, based on the probability distribution, the function, or any combination thereof.

In some embodiments, a range for each bin may be determined based, at least in part, on a training dataset. For instance, in some embodiments, a first bin may indicate a size range from 0 m up to a first size such that 4% of the objects from the training dataset would have a size smaller than the first size. Similarly, a last bin (e.g. a sixth bin as in FIG. 2), may indicate a range having a second size such that 4% of the objects from the dataset would have a size greater than or equal to the second size. In those embodiments, the ranges of the remaining bins (e.g. bins 2-4 in FIG. 2) are determined so as to each have an equal number of remaining objects from the training dataset. As a purely illustrative example, consider a probability distribution 320 corresponding to a training dataset having 100 objects, each object being uniformly distributed in size from 1 m to 100 m. Using such a dataset, the probability distribution 320 may have a first bin having a range of 0-4 m, a second bin having a range of 4 m-27 m, a third bin having a range of 27 m-50 m, a fourth bin having a range of 50 m-73 m, a fifth bin having a range of 73 m-96 m, and a sixth bin having a range of 96 m or greater.

FIG. 3 briefly illustrates a process 400 for estimating an object height, as described in detail above. Some or all of the process 400 can be performed by the computing system 700, as described below.

At 410, an image is received from an image capture device, such as a video camera. In some instances, the images can include any number of channels, such as RGB channels, LIDAR channels, etc. In some instances, the images can represent data from a single video camera. That is, an image can represent a monocular image. At 412, an object detector is run on the image, the output of which is one or more regions of interest. In some embodiments, the object detector may be selected to detect only certain classes of objects in the image (e.g. vehicles, pedestrians, buildings, etc.). In one or more embodiments, the object detector may indicate the object as a bounding box. In some embodiments, where no objects are detected, the process 400 may end. In other embodiments, process 400 may return to 410 to process additional images (e.g. additional frames in a video sequence). In those instances where objects are detected, the image is cropped at the region of interest (e.g. bounding box) of one detected object to form a cropped image. The cropped image is then resized and scaled to a user defined size (e.g. 224×224).

At 414, the cropped, resized, and scaled image is then input into a CNN. As above, in some embodiments, the CNN may comprise a VGG CNN which is adapted to accept only fixed size images and be further configured with two variable sized layers (e.g. having a size of 128) and one down-pooling layer. In still other embodiments, the CNN may also have a final 1-by-1 convolution layer, so as to remove the number of channels in the output.

At 416, an output of the CNN is used to determine an estimated size of the object. As discussed in further detail above, the CNN may output a probability distribution. The probability distribution is then used to determine a size (i.e. one or more of a height, width, length, etc.) of the object. In some embodiments, the estimated size of the object is then used to determine a location of the object, as will be discussed in further detail below.

The size and/or location may then be output to a subsequent system. In some embodiments, the size and/or location of objects are used to verify the integrity of other subsystems on an autonomous system. For example, the estimated size and/or location recovered at 416 may be used to verify that one of a LIDAR, radar, or stereo system depth estimate is working properly based on similar determinations of size, location, or the like. Additionally, or in the alternative, such an output from 416 may serve as a redundant system in the event that any or all such subsystems fail. In such an embodiment, output from 416 may provide sufficient information for an autonomous system to perform a safety maneuver, such as navigating to a safe stop. In some embodiments, the output of 416 alone may be used to navigate an autonomous system so as to avoid collision with any detected obstacles.

At 418, if any additional objects are in the image which haven't been processed, the process 400 returns to 412 to provide an estimated size and/or location for each of the remaining objects.

Location Estimation

Once an object size (i.e. any one or more of a height, width, or length) is estimated, it is possible to estimate a location of the object in a three-dimensional environment using intrinsics and extrinsics of the image capture device. Broadly, if a region of interest is known and an image size is known, it is possible to estimate the location of the corresponding object by positioning the object such that the projection of the object onto the image plane is coextensive with the region of interest. Though the following discussion provides an example of determining the location using height, any other size may be used (e.g. width or length). Additionally, though one particular method for determining a location from an estimated height is discussed, one having ordinary skill in the art would appreciate the below discussion as one of many approaches for calculating a location of an object relative to an image capture device based, at least in part, on that object's size and corresponding size and location in pixels on an image.

Assuming a pinhole camera (or otherwise rectified image), the location of the object can be determined using the relationship that a point in the environment (in the coordinate system of the image capture device) projects onto an image at image coordinate $(u, v)_i$ as:

$$\vec{p_i} = \begin{pmatrix} u \\ v \end{pmatrix}_i = \pi \left[ K \begin{pmatrix} x \\ y \\ z \end{pmatrix}_i \right],$$

where $(x, y, z)_i$ is a point in the environment relative to the image capture device, K is the image capture device's intrinsic matrix, and $\pi$ is the function defined by:

$$\pi \begin{pmatrix} x \\ y \\ z \end{pmatrix} = \begin{pmatrix} x/z \\ y/z \end{pmatrix}.$$

Similarly, an image coordinate may be unprojected into the environment via an inverse relationship, $$\begin{pmatrix} x \\ y \\ z \end{pmatrix}_i = d_i K^{-1} \begin{pmatrix} u \\ v \end{pmatrix}_i,$$

where $d_i$ is the depth associated with pixel $(u, v)_i$. By assuming that pixels unprojected from the top and bottom of the region of interest (or bounding box) must lie in the same plane (i.e. must have the same depth, d), a depth may be calculated such that:

$$dK^{-1} \begin{pmatrix} 0 \\ v_{top} - v_{bottom} \\ 0 \end{pmatrix} = \begin{pmatrix} 0 \\ H \\ 0 \end{pmatrix},$$

where $v_{top}$ is the v coordinate of a pixel along the top of the region of interest, $v_{bottom}$ is the v coordinate of a pixel along the bottom of a region of interest, and H is the height of the object. Once a depth, d, is calculated, a center of the object in the environment may be calculated as:

$$\begin{pmatrix} x \\ y \\ z \end{pmatrix}_c = dK^{-1} \begin{pmatrix} u \\ v_{top} \\ 1 \end{pmatrix} - \begin{pmatrix} 0 \\ \frac{H}{2} \\ 0 \end{pmatrix}.$$

If the extrinsics of the image capture device are also known, it would then be possible to transform the location to another frame of reference, as would be appreciated by one skilled in the art. Though presented in terms of determining an object's location based on an estimated height, similar calculations can be used to determine the location of an object based on other estimated dimensions (e.g. a width, length, or the like). Additionally, calculation of an estimated location may propagate any confidence metrics and/or standard deviations, as described above. Although described above as an unprojection operation, a similar calculation may be performed by the inverse operation (i.e. determining a location of an object such that points on either extent of the object projected into an image aligns with the extents of the region of interest, or bounding box).

Integration

In some embodiments, the size and/or location of objects in a monocular image may be integrated into autonomous systems to aid in obstacle avoidance and navigation. In certain embodiments, the estimated size and/or location can be used to supplement and/or compliment other hardware systems. For example, size estimates from a monocular size estimation process (such as any of those described in embodiments herein) may be used to verify that that object sizes recovered from LIDAR or stereo imaging techniques, for example, are correct. Additionally, or in the alternative, in some embodiments, a monocular size estimation process as described in any of the embodiments herein may be used as a failsafe. For example, if navigation or obstacle avoidance is calculated based on depth estimates from stereo imaging and one image capture device fails, the process described herein may allow for continued operation of an autonomous vehicle, despite having faulty equipment.

Exemplary Training

In order to train the CNN as illustrated in any embodiment herein, a ground truth image dataset (or training dataset) can be used. Ideally, every image of the dataset has one or more object having a known size and/or location. The CNN may then be trained based on the softmax function (or any loss function), incorporating data of the image dataset and the ground truth object sizes which correspond to them.

Figure 4:
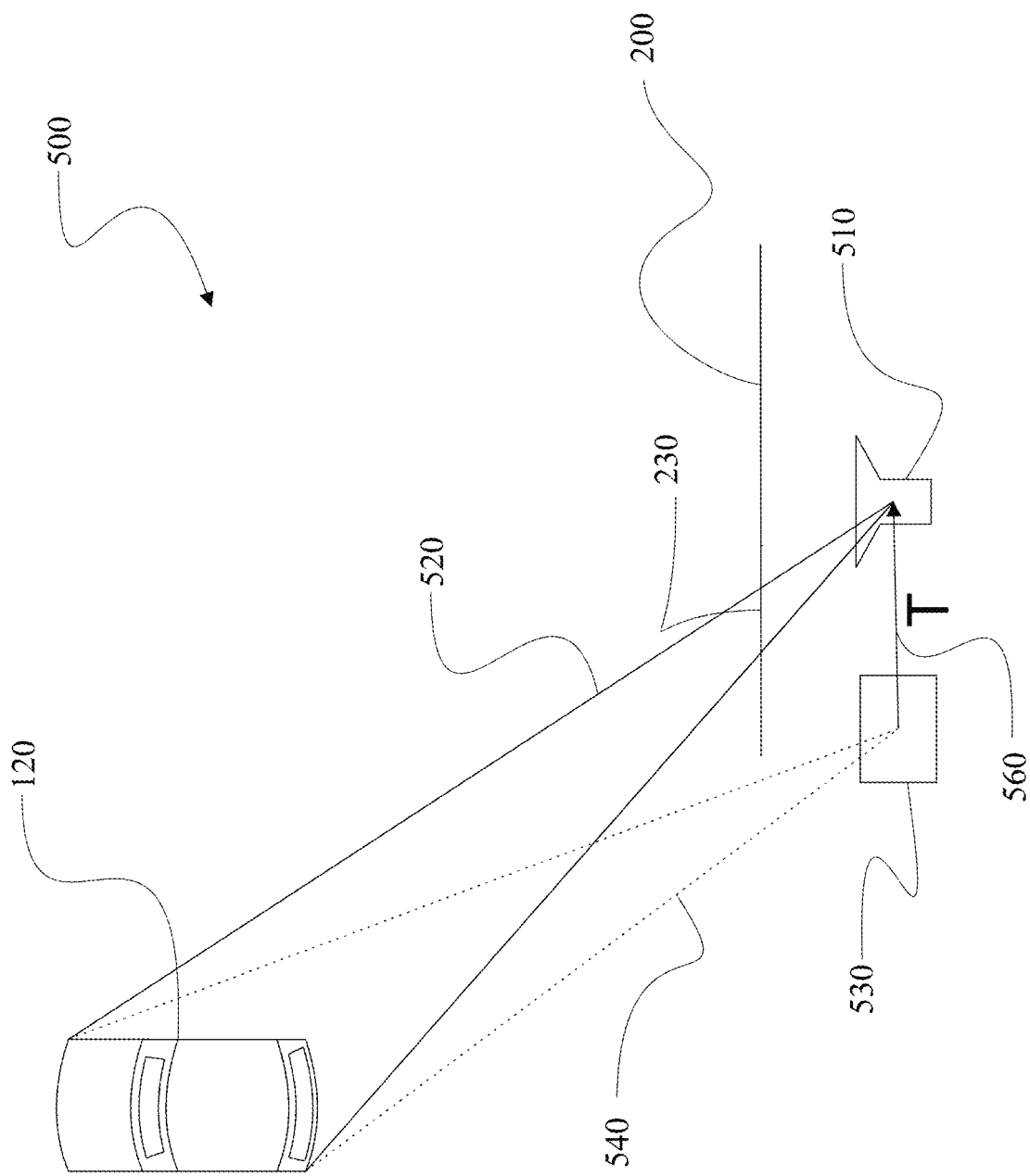
FIG. 4 illustrates an example layout for generating a ground truth dataset for training a convolutional neural network to recover object size from a monocular image.

FIG. 4 is a pictorial representation 500 of a process for generating a ground truth dataset. As mentioned above, CNNs can be trained based on ground truth datasets. Though these datasets may be created from synthetic data or hand labeled, it is generally best to create ground truth datasets which are similar to data that is to be captured and processed by the CNN. As such, in some embodiments, the ground truth dataset may be created using the same image capture device 510 that is used to estimate object sizes. As shown in FIG. 4, image capture device 510 may capture an image 200. The image 200 may comprise image data of the surrounding environment, including any objects, such as vehicle 120. Image data of the vehicle 120 as projected onto the image plane (as indicated by solid lines 520) may form vehicle image 220, the extents of which may be indicated by a region of interest, such as bounding box 230.

A depth sensing device 530 may capture depth information of the environment substantially simultaneously with the capture of image 200 by the image capture device 510.

By way of example, the depth sensing device 530 may be a LIDAR, a stereo pair of cameras, a depth camera, a radar, or the like. In those embodiments where the depth sensing device 530 is a LIDAR, stereo pair of cameras, or the like, the depth information may comprise, for example, a set of three dimensional points representative of the environment (or depth information).

The image capture device 510 and the depth sensing device 530 may be separated by a known transformation, T, 560. Such a transformation, T, 560 allows for transforming between coordinate systems (or reference frames) of the image capture device 510 and a coordinate system of the depth sensing device 530. For illustrative purposes, the transformation, T, 560 is depicted as originating from the depth sensing device 530 and toward the image capture device 510, however, any other representation of a transformation between the two devices is contemplated.

As above, an object detector may be run on image 200 to create one or more regions of interest, such as bounding box 230. Each region of interest may then be transformed from a reference frame (i.e. coordinate system) of an image capture device 510 to that of a depth sensing device 530 via transformation, T, 560. Once transformed, a subset of points from the depth sensing device 530 may be selected which lie within the region of interest (e.g. bounding box 230) as represented in the coordinate system of the depth sensing device 530. A size of the object 120 may then be determined based on the largest differences in positions of the subset of points. For example, in those coordinate systems in which height corresponds to a measurement in the "y" axis, a height may be determined from the largest difference in "y" values for all the points in the subset.

In some embodiments, before determining a size, the subset of points may be further refined so as to provide a better estimate of the object height. For example, the region of interest may include background objects which are greater in size than the object of interest. For example, errors in the object detector may output a bounding box 230 slightly larger than the vehicle 120 such that depth information of points within the region of interest include points on a tree situated behind the vehicle 120. Without excluding those points yields a height estimate greater than the actual height of the vehicle 120. In such an embodiment, the subset of points is refined by considering only those points within the subset of points which lie on a common plane. Thereafter, only the points which lie on a common plane may be used to determine a size of the object.

Once determined, the size of the object (i.e. one or more of a height, width, length) is associated with the object and stored as a member of the ground truth dataset. In some embodiments, the process described above may be performed on a log of previously recorded data.

FIG. 5 depicts an example process 600 for generating an example ground truth dataset. At 610, an image is captured at an image capture device. In some embodiments, the image capture device is the same as above, such as the image capture device illustrated in any of FIG. 2, 3, or 4. At 612, the image is sent to an object detector, such as those object detectors as described above. In some embodiments, if no objects are detected, process 600 may return to 610. In other embodiments, if no objects are detected process 600 may terminate. In those embodiments where one or more objects are detected, an object detector may indicate the location of the objects by one or more regions of interest, such as a bounding box.

At 614, the region of interest is transformed from the reference frame (i.e. coordinate system) of the image capture device to the reference frame of a depth sensing device (such as, but not limited to, a LIDAR, stereo camera, etc.). Such a depth sensing device may have captured depth information of an environment substantially simultaneously with the capture of image 200. In some embodiments, the depth information may comprise a set of points, each point having a coordinate (e.g. (x, y, z)) corresponding to a location in the environment relative to the depth sensing device.

At 616, a subset of points is created by selecting only those points from the depth sensing device which lie inside the region of interest as transformed into the reference frame of the depth sensing device. In some embodiments, the subset of points may be further refined by excluding any points within the subset of points which do not lie on a common plane, thereby creating a refined subset of points.

At 618, a size is calculated based on either the subset of points or the refined subset of points. For example, when creating a training dataset for estimating object height, a height may be determined by the largest difference between "y" values within the refined subset of points (in those coordinate systems where, for example, the "y" coordinate is associated with a measurement in a height direction). A location may also be provided as any of the refined subset of points, an average of the refined subset of points, a center of the refined subset of points, or the like. The size and/or location are then associated with the object detected in 612.

At 620, if any additional objects are detected in the image, the process 600 returns to 614 to determine the size and location of all remaining objects.

Process 600 may be repeated on any number of images, and corresponding depth information, to create a ground truth dataset.

Exemplary Computerized System

Figure 6:
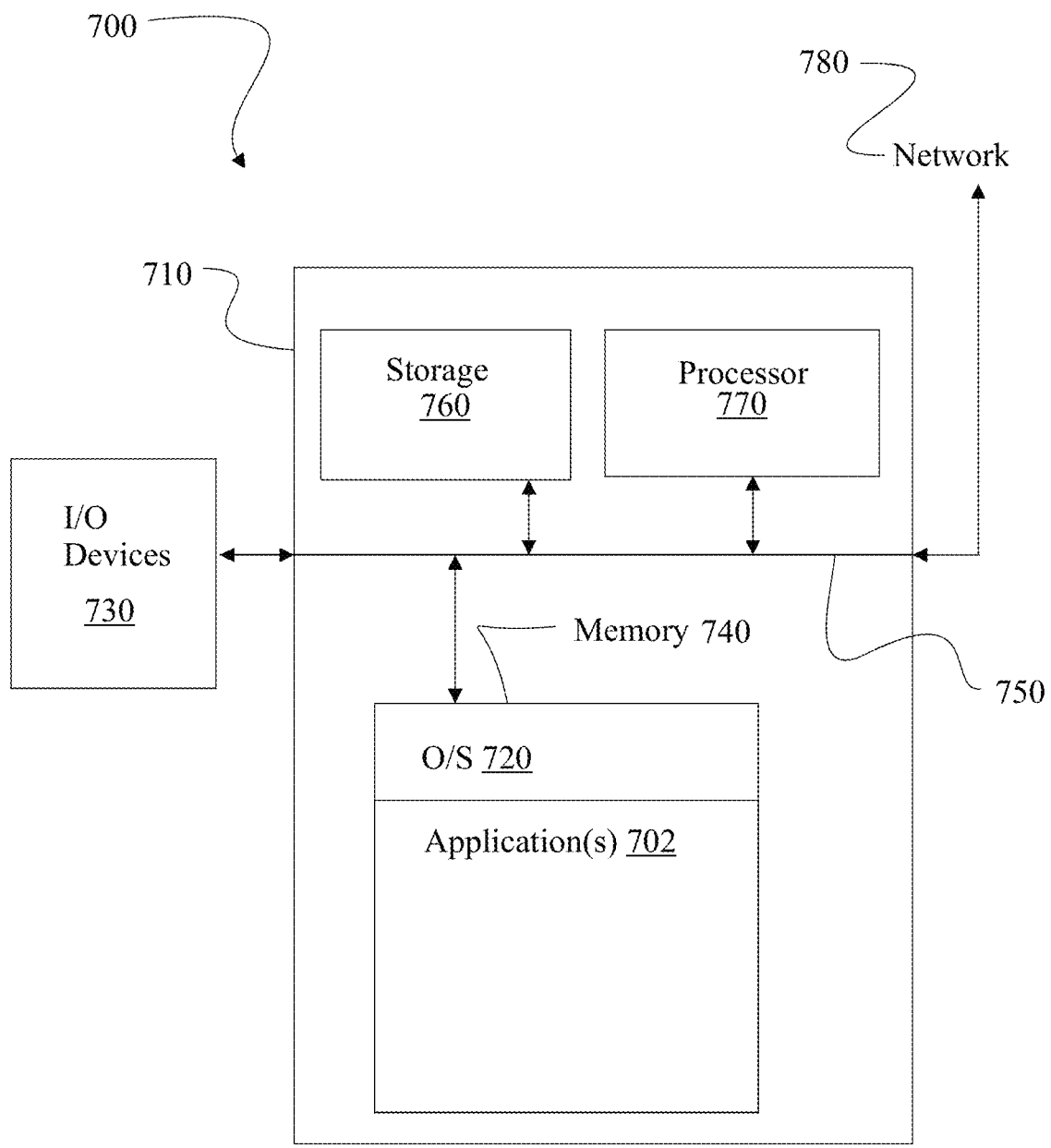
FIG. 6 depicts an example block diagram for a computer system implementing the techniques described herein.

Turning briefly to FIG. 6, a computerized system 600 is depicted as an example computerized system on which the disclosures may be implemented in whole or in part. The computerized system 700 depicts a computer system 710 that comprises a storage 760, one or more processor(s) 770, a memory 740, and an operating system 720. The storage 760, the processor(s) 770, the memory 740, and the operating system 720 may be communicatively coupled over a communication infrastructure 750. Optionally, the computer system 710 may interact with a user, or environment, via input/output (I/O) device(s) 730, as well as one or more other computing devices over a network 780, via the communication infrastructure 750. The operating system 720 may interact with other components to control one or more applications 720.

The systems and methods described herein can be implemented in software or hardware or any combination thereof. The systems and methods described herein can be implemented using one or more computing devices which may or may not be physically or logically separate from each other. The methods may be performed by components arranged as either on-premise hardware, on-premise virtual systems, or hosted-private instances. Additionally, various aspects of the methods described herein may be combined or merged into other functions.

An exemplary computerized system for implementing the systems and methods described herein is illustrated in FIG. 6. A processor or computer system can be configured to particularly perform some or all of the methods described herein. In some embodiments, the methods can be partially or fully automated by one or more computers or processors. The systems and methods described herein may be implemented using a combination of any of hardware, firmware and/or software. The present systems and methods described herein (or any part(s) or function(s) thereof) may be implemented using hardware, software, firmware, or a combination thereof and may be implemented in one or more computer systems or other processing systems. In some embodiments, the illustrated system elements could be combined into a single hardware device or separated into multiple hardware devices. If multiple hardware devices are used, the hardware devices could be physically located proximate to or remotely from each other. The embodiments of the methods described and illustrated are intended to be illustrative and not to be limiting. For example, some or all of the steps of the methods can be combined, rearranged, and/or omitted in different embodiments.

In one exemplary embodiment, the systems and methods described herein may be directed toward one or more computer systems capable of carrying out the functionality described herein. Example computing devices may be, but are not limited to, a personal computer (PC) system running any operating system such as, but not limited to, OS X™, iOS™, Linux™, Android™, and Microsoft™ Windows™. However, the systems and methods described herein may not be limited to these platforms. Instead, the systems and methods described herein may be implemented on any appropriate computer system running any appropriate operating system. Other components of the systems and methods described herein, such as, but not limited to, a computing device, a communications device, mobile phone, a smartphone, a telephony device, a telephone, a personal digital assistant (PDA), a personal computer (PC), a handheld PC, an interactive television (iTV), a digital video recorder (DVD), client workstations, thin clients, thick clients, proxy servers, network communication servers, remote access devices, client computers, server computers, routers, web servers, data, media, audio, video, telephony or streaming technology servers, etc., may also be implemented using a computing device. Services may be provided on demand using, e.g., but not limited to, an interactive television (iTV), a video on demand system (VOD), and via a digital video recorder (DVR), or other on demand viewing system.

The system may include one or more processors. The processor(s) may be connected to a communication infrastructure, such as but not limited to, a communications bus, cross-over bar, or network, etc. The processes and processors need not be located at the same physical locations. In other words, processes can be executed at one or more geographically distant processors, over for example, a LAN or WAN connection. Computing devices may include a display interface that may forward graphics, text, and other data from the communication infrastructure for display on a display unit.

The computer system may also include, but is not limited to, a main memory, random access memory (RAM), and a secondary memory, etc. The secondary memory may include, for example, a hard disk drive and/or a removable storage drive, such as a compact disc drive CD-ROM, etc. The removable storage drive may read from and/or write to a removable storage unit. As may be appreciated, the removable storage unit may include a computer usable storage medium having stored therein computer software and/or data. In some embodiments, a machine-accessible medium may refer to any storage device used for storing data accessible by a computer. Examples of a machine-accessible medium may include, e.g., but not limited to: a magnetic hard disk; a floppy disk; an optical disk, like a compact disc read-only memory (CD-ROM) or a digital versatile disc (DVD); a magnetic tape; and/or a memory chip, etc.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM discs. The processor and the memory can be supplemented by, or incorporated in, ASICs (application-specific integrated circuits).

The processing system can be in communication with a computerized data storage system. The data storage system can include a non-relational or relational data store, such as a MySQL™ or other relational database. Other physical and logical database types could be used. The data store may be a database server, such as Microsoft SQL Server™, Oracle™, IBM DB2™, SQLITE™, or any other database software, relational or otherwise. The data store may store the information identifying syntactical tags and any information required to operate on syntactical tags. In some embodiments, the processing system may use object-oriented programming and may store data in objects. In these embodiments, the processing system may use an object-relational mapper (ORM) to store the data objects in a relational database. The systems and methods described herein can be implemented using any number of physical data models. In one example embodiment, a relational database management system (RDBMS) can be used. In those embodiments, tables in the RDBMS can include columns that represent coordinates. In the case of economic systems, data representing companies, products, etc. can be stored in tables in the RDBMS. The tables can have predefined relationships between them. The tables can also have adjuncts associated with the coordinates.

In alternative exemplary embodiments, secondary memory may include other similar devices for allowing computer programs or other instructions to be loaded into computer system. Such devices may include, for example, a removable storage unit and an interface. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket), and other removable storage units and interfaces, which may allow software and data to be transferred from the removable storage unit to computer system.

The computing device may also include an input device such as, but not limited to, a voice input device, such as a microphone, touch screens, gesture recognition devices, such as cameras, other natural user interfaces, a mouse or other pointing device such as a digitizer, and a keyboard or other data entry device. The computing device may also include output devices, such as but not limited to, a display, and a display interface. The computing device may include input/output (I/O) devices such as but not limited to a communications interface, cable and communications path, etc. These devices may include, but are not limited to, a network interface card, and modems. Communications interface(s) may allow software and data to be transferred between a computer system and one or more external devices.

In one or more embodiments, the computing device may be operatively coupled to an automotive system. Such automotive system may be either manually operated, semi-autonomous, or fully autonomous. In such an embodiment, input and output devices may include one or more image capture devices, controllers, microcontrollers, and/or other processors to control automotive functions such as, but not limited to, acceleration, braking, and steering. Further, communication infrastructure in such embodiments may also include a Controller Area Network (CAN) bus.

In one or more embodiments, the computing device may be operatively coupled to any machine vision based system. For example, such machine based vision systems include but are not limited to manually operated, semi-autonomous, or fully autonomous industrial or agricultural robots, household robot, inspection system, security system, etc. That is, the embodiments described herein are not limited to one particular context and may be applicable to any application utilizing machine vision.

In one or more embodiments, the present embodiments can be practiced in the environment of a computer network or networks. The network can include a private network, or a public network (for example the Internet, as described below), or a combination of both. The network may include hardware, software, or a combination of both.

From a telecommunications-oriented view, the network can be described as a set of hardware nodes interconnected by a communications facility, with one or more processes (hardware, software, or a combination thereof) functioning at each such node. The processes can inter-communicate and exchange information with one another via communication pathways between them using interprocess communication pathways. On these pathways, appropriate communications protocols are used.

An exemplary computer and/or telecommunications network environment in accordance with the present embodiments may include nodes, which may include hardware, software, or a combination of hardware and software. The nodes may be interconnected via a communications network. Each node may include one or more processes, executable by processors incorporated into the nodes. A single process may be run by multiple processors, or multiple processes may be run by a single processor, for example. Additionally, each of the nodes may provide an interface point between network and the outside world, and may incorporate a collection of sub-networks.

In an exemplary embodiment, the processes may communicate with one another through interprocess communication pathways supporting communication through any communications protocol. The pathways may function in sequence or in parallel, continuously or intermittently. The pathways can use any of the communications standards, protocols or technologies, described herein with respect to a communications network, in addition to standard parallel instruction sets used by many computers.

The nodes may include any entities capable of performing processing functions. Examples of such nodes that can be used with the embodiments include computers (such as personal computers, workstations, servers, or mainframes), handheld wireless devices and wireline devices (such as personal digital assistants (PDAs), modem cell phones with processing capability, wireless email devices including BlackBerry™ devices), document processing devices (such as scanners, printers, facsimile machines, or multifunction document machines), or complex entities (such as local-area networks or wide area networks) to which are connected a collection of processors, as described. For example, in the context of the present disclosure, a node itself can be a wide-area network (WAN), a local-area network (LAN), a private network (such as a Virtual Private Network (VPN)), or collection of networks.

Communications between the nodes may be made possible by a communications network. A node may be connected either continuously or intermittently with communications network. As an example, in the context of the present disclosure, a communications network can be a digital communications infrastructure providing adequate bandwidth and information security.

The communications network can include wireline communications capability, wireless communications capability, or a combination of both, at any frequencies, using any type of standard, protocol or technology. In addition, in the present embodiments, the communications network can be a private network (for example, a VPN) or a public network (for example, the Internet).

A non-inclusive list of exemplary wireless protocols and technologies used by a communications network may include Bluetooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An exemplary non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

Embodiments of the present disclosure may include apparatuses for performing the operations herein. An apparatus may be specially constructed for the desired purposes, or it may comprise a general purpose device selectively activated or reconfigured by a program stored in the device.

In one or more embodiments, the present embodiments are embodied in machine-executable instructions. The instructions can be used to cause a processing device, for example a general-purpose or special-purpose processor, which is programmed with the instructions, to perform the steps of the present disclosure. Alternatively, the steps of the present disclosure can be performed by specific hardware components that contain hardwired logic for performing the steps, or by any combination of programmed computer components and custom hardware components. For example, the present disclosure can be provided as a computer program product, as outlined above. In this environment, the embodiments can include a machine-readable medium having instructions stored on it. The instructions can be used to program any processor or processors (or other electronic devices) to perform a process or method according to the present exemplary embodiments. In addition, the present disclosure can also be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection) and ultimately such signals may be stored on the computer systems for subsequent execution.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as an LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as CUDA, OpenCL, Flash™, JAVA™, C++, C, C#, Python, Visual Basic™, JavaScript™ PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™, Apple™ Mac™, iOS™, Unix™/X-Windows™, Linux™, etc. The system could be implemented using a web application framework, such as Ruby on Rails.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The systems, modules, and methods described herein can be implemented using any combination of software or hardware elements. The systems, modules, and methods described herein can be implemented using one or more virtual machines operating alone or in combination with one other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the present disclosure may be practiced with other computer system configurations, including hand-held devices, microprocessor systems, microprocessor-based or programmable consumer electronics, minicomputers, mainframe computers, etc. The systems and methods described herein may also be practiced in distributed computing environments where tasks are performed by remote processing devices that are linked through a network.

The terms "computer program medium" and "computer readable medium" may be used to generally refer to media such as but not limited to removable storage drive, a hard disk installed in hard disk drive. These computer program products may provide software to computer system. The systems and methods described herein may be directed to such computer program products.

References to "one embodiment," "an embodiment," "example embodiment," "various embodiments," etc., may indicate that the embodiment(s) of the present disclosure may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the description and claims, the terms "coupled" and "connected," along with their derivatives, may be used. It should be understood that these terms may be not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm may be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. As non-limiting examples, "processor" may be a Central Processing Unit (CPU) or a Graphics Processing Unit (GPU). A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods and the methods may be considered as a system.

While one or more embodiments have been described, various alterations, additions, permutations and equivalents thereof are included within the scope of the disclosure.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

Although the discussion above sets forth example implementations of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more processors; and
one or more non-transitory computer readable storage media storing computer-executable instructions that, when executed, cause the one or more processors to perform operations comprising:
receiving image data representing an environment associated with a vehicle;
determining, based at least in part on the image data, a region of interest associated with an object represented in the image data;
inputting, based at least in part on the region of interest, a portion of the image data to a neural network;
receiving, from the neural network, a probability distribution associated with the object, the probability distribution comprising a first probability associated with a first data range and a second probability associated with a second data range; and
determining, based at least in part on the probability distribution, at least one of an estimated size or an estimated location of the object.

2. The system of claim 1, wherein the first probability is associated with a first bin having the first data range and the second probability is associated with a second bin having the second data range.

3. The system of claim 2, wherein determining the at least one of the estimated size or the estimated location further comprises determining the estimated size, and wherein the first data range is associated with a first size range and the second data range is associated with a second size range that is different than the first size range.

4. The system of claim 1, wherein the region of interest comprises a bounding box associated with the object.

5. The system of claim 1, the operations further comprising:
cropping the image data based at least in part on the region of interest to determine the portion of the image data, wherein the portion of the image data comprises at least one of a red-green-blue (RGB) channel, a LIDAR channel, or a depth channel; and
maintaining or reducing, at the neural network, a number of channels of the portion of the image data.

6. The system of claim 1, wherein the neural network comprises a convolutional neural network, an inner product layer, or a down-sampling pooling layer.

7. The system of claim 1, wherein determining the at least one of the estimated size or the estimated location further comprises determining the estimated location of the object, the operations further comprising:
controlling the vehicle based at least in part on the estimated location.

8. The system of claim 1, wherein the object is a first object, the image data is first image data, and the region of interest is a first region of interest; and
wherein the neural network is trained based at least in part on training image data comprising:
a second region of interest associated with a second object, the second object being represented in second image data; and
at least one of height data or location data associated with the second object, the at least one of the height data or the location data being determined based at least in part on the second region of interest.

9. The system of claim 1, wherein the neural network is trained based at least in part on training data comprising depth data.

10. A method for estimating an object size from an image using a convolutional neural network, the method comprising:
   receiving image data representing an environment associated with a vehicle;
   determining, based at least in part on the image data, a region of interest associated with an object represented in the image data;
   inputting, based at least in part on the region of interest, a portion of the image data to a convolutional neural network;
   receiving, from the convolutional neural network, a probability distribution associated with the object, the probability distribution comprising a first probability associated with a first data range and a second probability associated with a second data range; and
   determining, based at least in part on the probability distribution, at least one of an estimated size or an estimated location of the object.

11. The method of claim 10, wherein the first probability is associated with a first bin having the first data range and the second probability is associated with a second bin having the second data range.

12. The method of claim 11, wherein determining the at least one of the estimated size or the estimated location further comprises determining the estimated size, and wherein the first data range is associated with a first size range and the second data range is associated with a second size range that is different than the first size range.

13. The method of claim 10, further comprising:
   cropping the image data based at least in part on the region of interest to determine the portion of the image data, wherein the portion of the image data comprises at least one of a red-green-blue (RGB) channel, a LIDAR channel, or a depth channel; and
   maintaining or reducing, at the convolutional neural network, a number of channels of the portion of the image data.

14. The method of claim 10, wherein the convolutional neural network comprises at least one of a Visual Geometry Group convolutional neural network, an inner product layer, or a down-sampling pooling layer.

15. The method of claim 10, wherein determining the at least one of the estimated size or the estimated location further comprises determining the estimated location of the object, the method further comprising:
   controlling the vehicle based at least in part on the estimated location.

16. The method of claim 10, wherein the object is a first object, the image data is first image data associated with a first image, and the region of interest is a first region of interest; and
   wherein the convolutional neural network is trained based at least in part on training image data comprising:
   a second region of interest associated with a second object, the second object being represented in second image data; and
   at least one of height data or location data associated with the second object, the at least one of the height data or the location data being determined based at least in part on the second region of interest.

17. One or more non-transitory computer-readable media having stored thereon processor-executable instructions that, when executed by a computer system, cause the computer system to:
   receive image data representing an environment associated with a vehicle;
   determine, based at least in part on the image data, a region of interest associated with an object represented in the image data;
   input, based at least in part on the region of interest, a portion of the image data to a convolutional neural network;
   receive, from the convolutional neural network, a probability distribution associated with the object, the probability distribution comprising a first probability associated with a first data range and a second probability associated with a second data range; and
   determine, based at least in part on the probability distribution, at least one of an estimated size or an estimated location of the object.

18. The one or more non-transitory computer-readable media of claim 17, wherein the first probability is associated with a first bin having the first data range and the second probability is associated with a second bin having the second data range.

19. The one or more non-transitory computer-readable media of claim 18, wherein determining the at least one of the estimated size or the estimated location further comprises determining the estimated size, and wherein the first data range is associated with a first size range and the second data range is associated with a second size range that is different than the first size range.

20. The one or more non-transitory computer-readable media of claim 17, the instructions further causing the computer system to:
   crop the image data based at least in part on the region of interest to determine the portion of the image data, wherein the portion of the image data comprises at least one of a red-green-blue (RGB) channel, a LIDAR channel, or a depth channel; and
   maintain or reduce, at the convolutional neural network, a number of channels of the portion of the image data.

* * * * *